US012706400B2

(12) United States Patent
Fehling et al.

(10) Patent No.: US 12,706,400 B2
(45) Date of Patent: Aug. 11, 2026

(54) ARRANGEMENT MADE UP OF AT LEAST A CLAMPING SPRING AND A RETAINING SPRING AND A SPRING-FORCE CLAMP FOR CONDUCTORS

(71) Applicant: Weidmüller Interface GmbH & Co. KG, Detmold (DE)

(72) Inventors: Stephan Fehling, Lage (DE); Michael Lenschen, Detmold (DE); Marcel Mainka, Lage (DE); Volker Schröder, Lemgo (DE); Karlo Stjepanovic, Bielefeld (DE)

(73) Assignee: Weidmüller Interface GmbH & Co. KG, Detmold (DE)

( * ) Notice: Subject to any disclaimer, the term of this patent is extended or adjusted under 35 U.S.C. 154(b) by 338 days.

(21) Appl. No.: 18/335,374

(22) Filed: Jun. 15, 2023

(65) Prior Publication Data

US 2024/0030627 A1 Jan. 25, 2024

(30) Foreign Application Priority Data

Jul. 19, 2022 (DE) ..................... 10 2022 118 078.6

(51) Int. Cl.
*H01R 4/58* (2006.01)
*H01R 4/48* (2006.01)

(52) U.S. Cl.
CPC ........... *H01R 4/58* (2013.01); *H01R 4/48365* (2023.08)

(58) Field of Classification Search
CPC .............................. H01R 4/58; H01R 4/48365
USPC ........................................ 439/816, 886, 936
See application file for complete search history.

(56) References Cited

U.S. PATENT DOCUMENTS

2011/0124243 A1* 5/2011 Park .................. G01R 1/06722 29/896.9
2022/0416460 A1* 12/2022 Yamada .................. B22F 1/068

FOREIGN PATENT DOCUMENTS

DE 102019132316 A1 6/2021

OTHER PUBLICATIONS

Properties of some PFPE lubricants (Year: 2017).*

* cited by examiner

*Primary Examiner* — Christopher M Koehler
*Assistant Examiner* — Gregory L Mangot
(74) *Attorney, Agent, or Firm* — Laubscher & Fretwell, P.C.

(57) ABSTRACT

An assembly for contacting an electrical conductor includes a clamping spring which acts as a pressure spring for fixing an electrical conductor in a spring-force clamp and a retaining spring for locking the clamping spring in an open position such that the conductor can be introduced into a contact region in a shifting direction. The clamping spring touches the retaining spring along a contact surface in a locked state and during movement from the locking state into a unlocking state. A lubricant-containing coating is arranged on at least the contact surface.

8 Claims, 3 Drawing Sheets

ARRANGEMENT MADE UP OF AT LEAST A CLAMPING SPRING AND A RETAINING SPRING AND A SPRING-FORCE CLAMP FOR CONDUCTORS

This application claims priority of DE 2022 118 078.6 filed Jul. 19, 2022. The entire content of this application is incorporated herein by reference.

BACKGROUND OF THE INVENTION

The present invention relates to an assembly made up of a clamping spring and a retaining spring, and a spring-force clamp as an assembly made up of the clamping spring with a busbar which is provided to contact an electrical conductor, in particular a stranded conductor.

BRIEF DESCRIPTION OF THE PRIOR ART

Numerous embodiments of spring-force clamps are known which are configured as direct-plugging (push-in) clamps with a pressure spring, which presses the conductor against the busbar.

Therefore, it is known to lock the clamping or pressure spring in an open position so that a conductor can easily be guided into a contact region. Locking of the clamping spring in an open position is performed, in accordance with a known prior art, by an actuating device such as a push-button which can be locked on the clamping housing, the push-button holding the clamping leg in an open position. By releasing the actuating device after the conductor has been introduced, the clamping leg can relax and press the conductor against the busbar. A disadvantage is that the actuating device has to be manually released in order to contact the conductor.

DE 10 2019 132 316 A1 discloses a generic spring-force clamp with which the wear on the clamping edge of the clamping spring is reduced and a plugging error or premature triggering of the clamping spring is effectively prevented.

However, there is a need to adapt the spring constant of the aforementioned clamping spring in favor of a stronger clamping force for particular applications. However, practical trials have surprisingly shown that an increase in the spring constant through thermal treatment is accompanied by a clear increase in the coefficients of friction, which makes it difficult to trigger the clamping mechanism.

Taking the aforementioned prior art as a starting point, the aim of the present invention is to adapt the generic spring-force clamps in favor of higher clamping forces without impeding/impairing the triggering mechanism of the spring-force clamp.

SUMMARY OF THE INVENTION

An assembly according to the invention includes a clamping spring which acts as a pressure spring for fixing an electrical conductor in a spring-force clamp. The spring-force clamp need not be part of the assembly according to the invention, but rather serves to describe the function of the clamping spring.

The assembly according to the invention further includes a retaining spring for locking the clamping spring in an open position such that the conductor can be introduced in a shifting direction into a contact region of the spring-force clamp.

The clamping spring and the retaining spring touch one another along a contact surface in the locked state and when moving from the locking state into an unlocking state.

According to the invention, the contact surface has a lubricant-containing coating. A contact clamp typically does not require any such coatings, especially since the electrical contact between the conductor and the spring clamp is hampered by a lubricant.

However, through the lubricant-containing coating, a reduction of the coefficient of friction in the region of the locking mechanism is achieved in a targeted manner, as a result of which triggering of the clamping effect is also advantageously counteracted after the occurrence of annealing and an undesired increase in the coefficient of friction through thermal treatment to increase the spring force.

Advantageously, the contact surface can include both a stop face between the retaining spring and the clamping spring, and also the adjacent region of the retaining spring, over which the contact spring slides during the unlocking movement.

The lubricant-containing coating can advantageously have a perfluoropolyether (PFPE). This substance is durable in the long term during constant use and changes its viscosity and its adhesion only marginally during constant use.

A PFPE, preferably a hexafluoropropene, makes up more than 75 wt %, preferably more than 85 wt %, of the lubricant-containing coating.

Additionally, a solvent, preferably a base oil, preferably makes up less than 20 wt % of the lubricant-containing coating. This can be employed to set a preferred viscosity and/or density.

For a surface distribution, the applied lubricant can advantageously have a density between 1.55-1.75 g/cm$^3$ (at 20° C.).

In one embodiment of the invention, the assembly can have, adjacent to the contact surface, an uncoated surface with a higher, preferably on average at least 50% higher, coefficient of friction than the contact surface. The region equipped with the lubricant-containing coating can preferably be less than 300% of the contact surface, and preferably less than 150% of the contact surface. In particular, a contact surface with the electrical conductor can be formed free of the coating.

The assembly is preferably formed as a one-piece component.

Moreover, the assembly can be thermally pretreated so that the spring constants of the individual elements of the assembly are increased. This is visible through a surface coloring through annealing coloring.

Furthermore, a spring-force clamp, formed as a direct-plugging clamp, for connecting a conductor, in particular a stranded conductor, has an assembly including a busbar for contacting an electrical conductor and a clamping spring which acts as a pressure spring of the assembly for fixing the electrical conductor in the spring-force clamp. A retaining spring locks the clamping spring in an open position, such that the conductor can be introduced in a shifting direction into a contact region. The clamping spring has a clamping leg with a clamping edge. The clamping leg can pivot in a pivoting direction, and the retaining spring has a pivotable pivoting leg. The pivoting leg has at least one retaining device and the clamping leg has a locking device which interacts with the retaining device of the pivoting leg in the locking state of the clamping leg. The clamping leg can be adjusted from a locking state in which it is locked in the open position by the retaining device of the pivoting leg by shifting the electrical conductor into a clamping state in which the clamping leg is unlocked by the retaining device and pushes the electrical conductor against the busbar with the clamping edge of the clamping leg. The locking device of the clamping leg is formed spaced apart from the clamping edge of the clamping leg.

The spring-force clamp furthermore includes a resetting device for pivoting-back the clamping leg with which the clamping leg can be pivoted back from the clamping state into the locking state by shifting the restoring device against the pivoting direction.

The resetting device or a surface for guiding the resetting device can also have the lubricant-containing coating.

A series terminal or a plug connector with one or more spring-force clamps according to the invention are also provided.

A method for making a clamping spring assembly includes forming the retaining spring of the assembly, thermally annealing the retaining spring, preferably at temperatures of more than 250° C. and coating, at least in regions, the retaining spring with the lubricant-containing coating.

A spring-force clamp is created for connecting a conductor and particularly a stranded conductor. The spring-force clamp includes a busbar for contacting an electrical conductor, and a clamping spring, which acts as a pressure spring, for fixing the electrical conductor in the spring-force clamp, and a retaining spring for locking the clamping spring in an open position, so that the conductor can be introduced into a contact region in a shifting direction.

The clamping spring has a clamping leg with a clamping edge. The clamping leg can pivot about a first pivot axis in a pivoting direction, and the retaining spring has a pivoting leg which can pivot about a second pivot axis, wherein the pivoting leg has at least one retaining device. The clamping spring and the retaining spring can be formed integrally with one another, which is particularly cost-effective, but can also be manufactured separately and then connected to one another, wherein the spacing of locking from the clamping edge can have an advantageous effect in each case.

The pivoting leg has at least one retaining device in the sense of a first locking device and the clamping leg has a mating locking device which interacts with the retaining device of the pivoting leg in the locking state of the clamping leg. The clamping leg can be adjusted from a locking state in which it is locked to the pivoting leg by the retaining device of the pivoting leg and is held in the open position or conductor introduction position, by shifting the electrical conductor into a clamping state in which the clamping leg is unlocked from the retaining device and pushes the electrical conductor against the busbar with the clamping edge of the clamping leg, so that the conductor contacts the busbar.

The locking device of the clamping leg is also formed spaced from the clamping edge of the clamping leg.

Thus, through this configuration, a spring-force clamp is created which divides the locking mechanism of the clamping spring in a separation at the clamping spring—in particular at the clamping leg thereof—into a separate locking device and a clamping edge, which is geometrically and functionally separated for clamping the conductor against a busbar and also advantageously reduces wear on the clamping edge of the clamping spring through the separation of the contact edge and the locking device.

Thus, the retaining device of the pivoting leg is not locked directly on the clamping edge of the clamping leg.

In this way, the retaining device cannot abrade on the clamping edge if it is released from the clamping edge. In this way, the clamping edge is protected in a simple manner from excessive wear through a wiring process.

In addition, a plugging error or premature triggering of the clamping spring is prevented since the locking mechanism is not in the conductor introduction region.

For example, this can be implemented structurally by the locking device of the clamping leg being formed on the clamping leg spaced more than 1 mm, in particular more than 3 mm, from the clamping edge of the clamping leg.

The spring-force clamp additionally includes a resetting device for pivoting-back the clamping leg wherein the clamping leg can be pivoted back from the clamping state into the locking state by shifting the resetting device against the pivoting direction.

In order to arrive at a simple structural design of the clamping spring, the clamping spring can be formed integrally with the retaining spring. This produces a simple mounting process and inexpensive production of the clamping spring.

However, the spring-force clamp has, alongside the clamping spring, a separate retaining spring, with the clamping spring and the retaining spring being able to be connected to one another through a connection.

According to another embodiment of the invention, the clamping spring can have a support leg with which it is supported on a corresponding abutment.

The abutment can be an abutment leg of the busbar. However, it is also possible that the abutment is the clamping housing.

As a result of the retaining spring being able to have a pressure surface which is arranged transverse to the shifting direction, a simple and effective and thus advantageous possibility for unlocking the clamping spring through the conductor end is created. It is also advantageous if the retaining device is integrally molded on the pivoting leg. As a result, there arises a simple structural implementation of the retaining device on the pivoting leg.

According to another embodiment of the invention, the pivoting leg can be formed in an angular shape. It is also advantageous if the pressure surface is attached to a first, downwardly bent leg of the pivoting leg. As a result, the connecting device is also formed in a structurally simple manner. The clamping leg may be formed in a type of angle shape, since this increases the design possibilities in a geometric sense.

It is also advantageous if the retaining device of the pivoting leg in one embodiment is formed by a locking edge arranged at the end of a second, upwardly bent leg of the angled pivoting leg. As a result, there arises a simple structural implementation of the retaining device on the pivoting leg.

In another embodiment, the retaining device of the pivoting leg can also be formed as an exposed tab of the pivoting leg. Through such a structural form, there arises a simple and thus advantageous structural implementation of the retaining device on the pivoting leg.

In a further preferred embodiment of the invention, the retaining device of the pivoting leg can be formed as at least one hook or at least one bar and can be formed integrally with the pivoting leg. As a result, there arises in turn a simple structural design of the retaining device.

Particularly advantageous—because they can be realized compactly and without a large amount of waste—are embodiments in which the respective hook is cut out laterally or centrally from the material of the pivoting leg and bent out and serves to engage, from behind, a corresponding edge or tab or the like on the clamping leg, this edge or tab or the like being situated spaced apart from the clamping edge in a recess or a hole in the clamping leg.

As a result of the first, downwardly bent leg and the second, upwardly bent leg being able to be connected integrally to one another by a bend, the rigidity of the pivoting leg of the retaining spring can be increased using a simple structural device.

In a further preferred embodiment of the invention, the pivoting leg of the retaining spring can have, in the region of the second, upwardly bent leg of the bend and of the first downwardly bent leg, a breakthrough in which the clamping leg engages when the clamping leg is in the locking state. As a result, there arises an advantageous space-saving construction of the retaining spring, and there also arises an advantageously increased clamping force of the clamping spring.

It is also advantageous if the breakthrough has a constriction in the region of the retaining device and the bend in the pivoting leg of the retaining spring. As a result, a locking device can be formed in a simple manner on the clamping leg of the clamping spring.

It is also advantageous if the clamping leg has a tapered shape which geometrically corresponds to the constriction, such that the clamping leg can, for example, move freely through the breakthrough of the pivoting leg. As a result, there arises a space-saving construction of the retaining spring.

In a further preferred embodiment of the invention, the locking device of the clamping leg can be molded integrally on the clamping leg or be formed with it. As a result, there arises a simple structural implementation of the locking device on the clamping leg.

It is also advantageous if the locking device of the clamping leg is exposed from the clamping leg and can be integrally connected to it. This locking device can be formed as a section of a hole or a recess for example, as a bar or hook.

The locking device of the clamping leg may be formed as a tab which is formed by the tapered shape of the clamping leg and therefore is not exposed. Also, this produces a simple structural formation of the locking device.

It is also advantageous if the locking device of the clamping leg is formed as a bent tab and is integrally molded externally on the clamping leg.

In a further preferred embodiment of the invention, the support leg of the clamping spring can have a breakthrough which is like an elongated hole and which is arranged on both sides along a line of symmetry of the support leg. Through the length and breadth of the elongated hole, the rigidity of the support leg can be set advantageously simply through a simple forming device in response to the respective demands.

It is also advantageous if the pivoting leg, according to one embodiment, has a cutout limited by the retaining device of the pivoting leg.

In a further preferred embodiment of the invention, the resetting device, in the locking state, can be arranged between the clamping spring and the electrical conductor and can be shifted in and counter to the shifting direction. As a result, there arises a simple resetting of the clamping spring from the locking state.

It is also advantageous if, according to one embodiment, the resetting device in the clamping state is clamped between the clamping leg and a clamping housing. As a result, with a simple device there arises a self-reinforcing clamping effect of the resetting device when the spring-force clamp is in the clamping state.

It is also advantageous if the resetting device can be shifted to push the clamping leg back in the shifting direction. As a result, there arises a clamping leg resetting process which is simple to handle and secure.

According to a further embodiment, there can be applied onto the retaining spring a stop element on which the pressure surface is formed. The stop element—where appropriate with the bead—has the advantage that it can be formed more optimally with the desired geometry through the injection-molding process than if it is introduced directly into the pressure surface of the spring, because the spring material only allows a limited deformation process.

According to another preferred embodiment of the invention, the pressure surface can have a bead-type recess. The bead-type recess realizes, in a simple manner, a bundling/centering of the strands during wiring, in order to minimize unbraiding of the strands. In addition, the force at which the strands unbraid can also be increased.

Therefore, it is advantageous if the pressure surface according to one embodiment exerts, through a bead-like recess, a self-centering effect on the conductor or its core. As a result, a secure function of the pressure surface is guaranteed by an advantageously simple structural formation.

The invention also relates to a series terminal or plug connector with one or more spring-force clamps according to one or more of the claims relating thereto.

BRIEF DESCRIPTION OF THE FIGURES

The invention is described in greater detail hereinafter with reference to the accompanying drawing in which.

DETAILED DESCRIPTION

Figure 1:
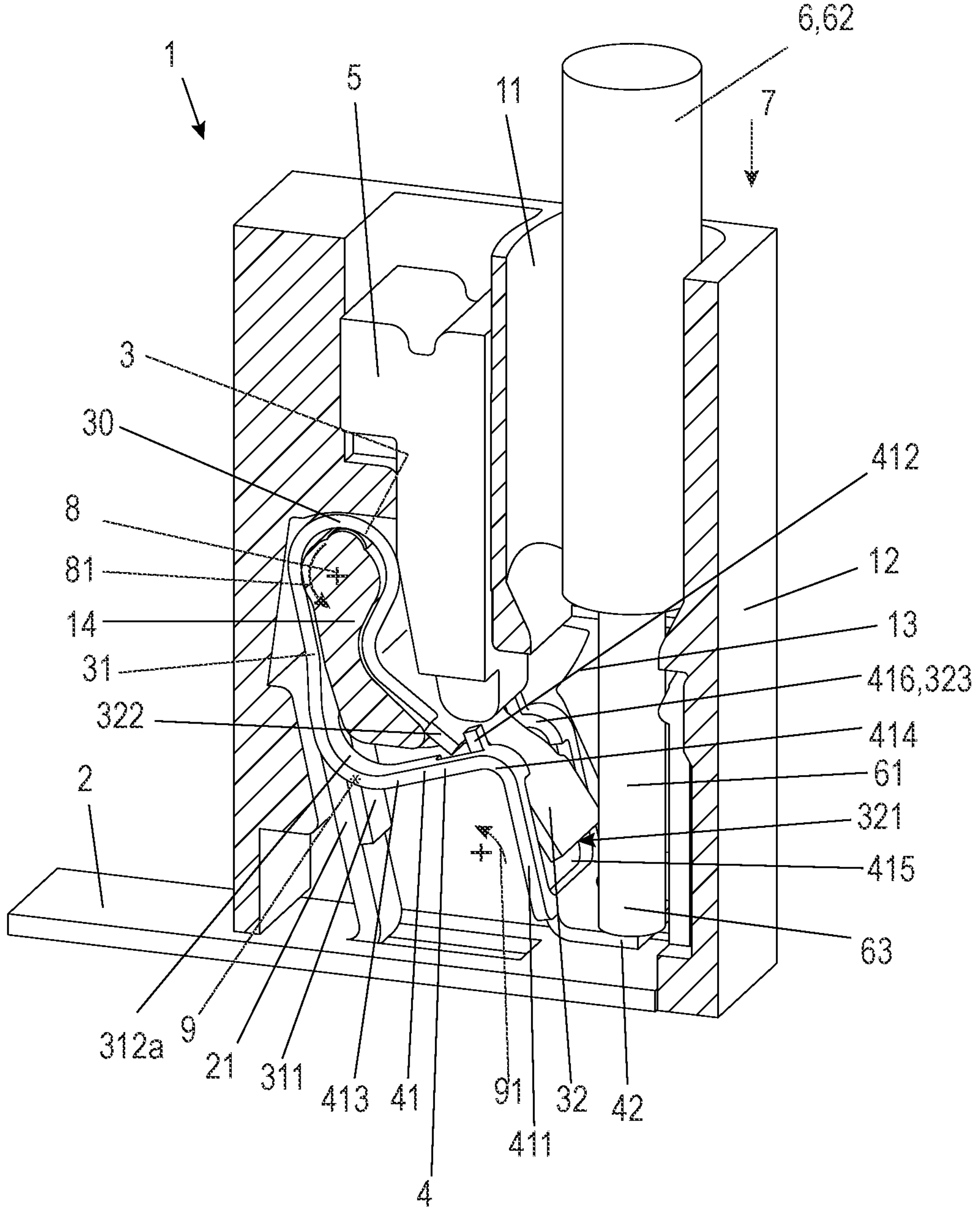
FIG. 1 is a sectional perspective view of a spring-force clamp according to the invention with a clamping leg in the locking state for clamping an electrical conductor which is introduced into the spring-force clamp.

FIG. 1 shows a spring-force clamp 1 as a connecting device for electrical conductors. The conductors to be connected, in particular in the plug-in direction 7, are formed as stripped conductor ends. These conductor ends can also be formed as a finely stranded conductor or stranded conductor. However, the spring-force clamp is also suitable for single-stranded conductors.

The spring-force clamp can be used in various manners, such as a connecting device of a series terminal for example, and also as a spring-force clamp for plug connectors or the like.

The spring-force clamp 1 has a busbar 2 for contacting an electrical conductor 6. The busbar 2 can be configured as an L-shape. However, it can also be part of a multi-walled clamping cage. The clamping cage can be formed as a U shape in plan view, such that one conductor end can be introduced into the cross-section of the U and can also have a lower transverse wall. The spring-force clamp 1 then has a clamping spring 3 which acts as a pressure spring and which is provided for clamping the electrical conductor 6 in the spring-force clamp 1, as a result of which the electrical conductor 6 permanently contacts the busbar 2 in an electrically conductive manner. Therefore, the clamping spring 3 serves to press the conductor 6 against the busbar 2.

Alongside the clamping spring, a retaining spring 4 is provided. This makes it possible to be able to lock part of the clamping spring 3, namely a clamping leg 32, in an open position, such that the conductor 6, when the clamping spring is in the opened and tensed state of the clamping spring, can be inserted into an insertion aperture 11 of the spring-force clamp 1 up to a contacting region. The clamping spring 3 can be integrally formed with the retaining spring 4. However, the retaining spring 4 can also be produced separately from the clamping spring 3. The retaining spring 4 can then be connected to the clamping spring 3. Preferably, with the "clamping spring assembly" according to FIG. 1, a component is created that integrates in one component the functions of the clamping spring 3 and the retaining spring 4. This functionally integrated formation of the clamping spring 3 with the integrally molded-on retaining spring 4 is advantageous, but not compulsory.

The busbar 2 and the clamping spring 3 are arranged in the clamping housing 12 which is preferably manufactured from an electrically insulated material, in particular from a plastic. An insertion aperture 11 for introducing the electrical conductor 6 is provided in the clamping housing 12. The depicted electrical conductor 6 has an electrically insulating sheathing 62 which is stripped above an open end 63 of the electrical conductor 6 such that a core 61 of the electrical conductor 6 is visible. The clamping spring 3 has a clamping leg 32 which can be pivoted about a pivot axis 8 in and counter to a pivoting direction 81, and a support leg 31 with which it is supported in a simple and secure manner on a corresponding abutment, in particular when the clamping leg 32 is pivoting. This abutment can be formed as a support leg 21. This can be molded integrally on the busbar 2 or be bent out from it. However, in other embodiments the support leg 31 can also be supported in another manner, such as directly in the clamping housing 12.

The support leg 31 has a centrally arranged retaining tab 311. This can be bent out of the retaining leg 31. The retaining tab 311 is supported on the abutment on a corresponding support device such as an abutment leg 21. The support leg 31 and the clamping leg 32 of the clamping spring 3 are preferably connected to one another via a bend 30. An advantageous support profile 14 of the clamping housing 12, which is penetrated by the axis of rotation 8 and which also serves as a limitation of movement for the clamping leg 32, can engage in this bend 30. The clamping spring 3 is overall formed in approximately a V-shape.

To the side of the retaining tab 311, there extend here two connecting legs 312*a*, 312*b* which serve as a connecting device to the retaining spring 4 which is connected integrally to the clamping spring 3. However, the retaining spring 4 could also be attached to the clamping spring, for example to the support leg 31 as a separately produced component, and thus be fastened to the support leg 31. Here, the connecting legs 312*a*, 312*b* form an angled, approximately right-angled, bend to the retaining spring 4.

The retaining spring 4 then has a pivoting leg 41. For structural reasons, this pivoting leg 41 is formed to be bent and has at the end a pressure surface 42 on which the conductor end hits upon being introduced, such that it can move the pivoting leg 41.

In this regard, the pivoting leg 41 is formed to be resiliently pivotable relative to the clamping spring 3, in particular relative to the support leg 31 thereof. The pivoting leg 31 can attach or be molded onto the two connecting legs 312*a*, 312*b* or molded integrally with the legs.

The retaining spring 4 and/or its pivoting leg 41 is/are pivotable about a second pivot axis 9 in and counter to a second pivoting direction 91. In order to be able to pivot the clamping leg 32 into the second pivoting direction 91, the retaining spring 4 has a pressure surface 42 with which the pivoting leg is pivotable. The pressure surface 42 can be arranged transverse to the shifting direction 7. By exerting pressure onto the pressure surface 42, the retaining spring 4 is pivotable in the second pivoting direction 91. The pressure surface 42 is attached to a first, downwardly bent leg 411 of the pivoting leg 41. At the pivoting leg 41, there are formed one or more retaining devices 412 which are preferably integrally molded onto the pivoting leg 41. IN the embodiment shown, the retaining device 412 includes two locking edges arranged approximately at the end of a second, upwardly bent leg 413 of the angle-shaped pivoting leg 41. The first, downwardly bent leg 411 and the second, upwardly bent leg 413 are integrally connected to one another by a bend 414.

The clamping leg 32 of the clamping spring 3 has at least one locking device 322. In the embodiment shown, there two locking devices spaced apart from a clamping edge 321—formed approximately on half of the longitudinal extent of the clamping leg. Each locking device is formed to be locked on the retaining device 412 of the pivoting leg 41 of the retaining spring 4, as a result of which the clamping leg can be locked in an open position (called the locking state). The locking devices 322 are formed spaced preferably more than 1 mm, in particular more than 2 mm, apart from the clamping edge 321 so that they cannot be damaged while the clamp is being wired with and unwired from a conductor. The locking device 322 does not interact with the clamping edge 3121, i.e. it is not able to lock onto this, such that, in use, it also cannot damage the clamping edge. On the contrary, the locking device 322 interacts with the retaining device 412 such that the clamping edge is not locked.

The locking device 322 can be molded integrally on the clamping leg 32. It can be exposed from the clamping leg 32 or be formed in it as a recess or step. They form a locking connection with the retaining device 412 of the pivoting leg 41 of the retaining spring 4 in the locking state of the clamping leg 32. In this manner, the clamping spring 3 is lockable in an open position, from which it is released when the conductor is introduced.

The pivoting leg 41 has, in the region of the second, upwardly bent leg 413—i.e. in the prolongation of the connecting legs 31*a*, 31*b*—of the bend 414 and the first downwardly bent leg 411, a breakthrough 415, which the clamping leg 32 dips into when the clamping leg 32 is in the locking state. The breakthrough 415 has in the region of the retaining device 412 and of the bend 414 a constriction 416. In this way, a compact design is secured.

The clamping leg 32 accordingly has a geometrically corresponding tapered shape 323, which is directly attached here to the locking device/locking edges 322, such that the clamping leg 32 can move freely through the breakthrough 415.

When the retaining spring 4 pivots about the second pivot axis 9, the retaining device 412 is pivoted with it counter to the resetting force of the pivoting leg 41. As a result, the position of the retaining device 412 changes until the clamping leg 32 of the clamping spring 3 is unlocked. The locking and/or unlocking can be enabled by a locking aid which is mounted in a linearly movable manner in FIG. 1.

Between the clamping spring 3 and the busbar 2 there is formed a free space 13, in which the electrical conductor 6, when the clamping leg 32 is in the locking state, can be introduced in a freely shiftable manner in and counter to the shifting direction 7.

When the electrical conductor 6 introduced into the spring-force clamp 1 is shifted in the shifting direction 7, the open end 63 of the electrical conductor 6 comes into contact with the pressure surface 42.

Figure 2:
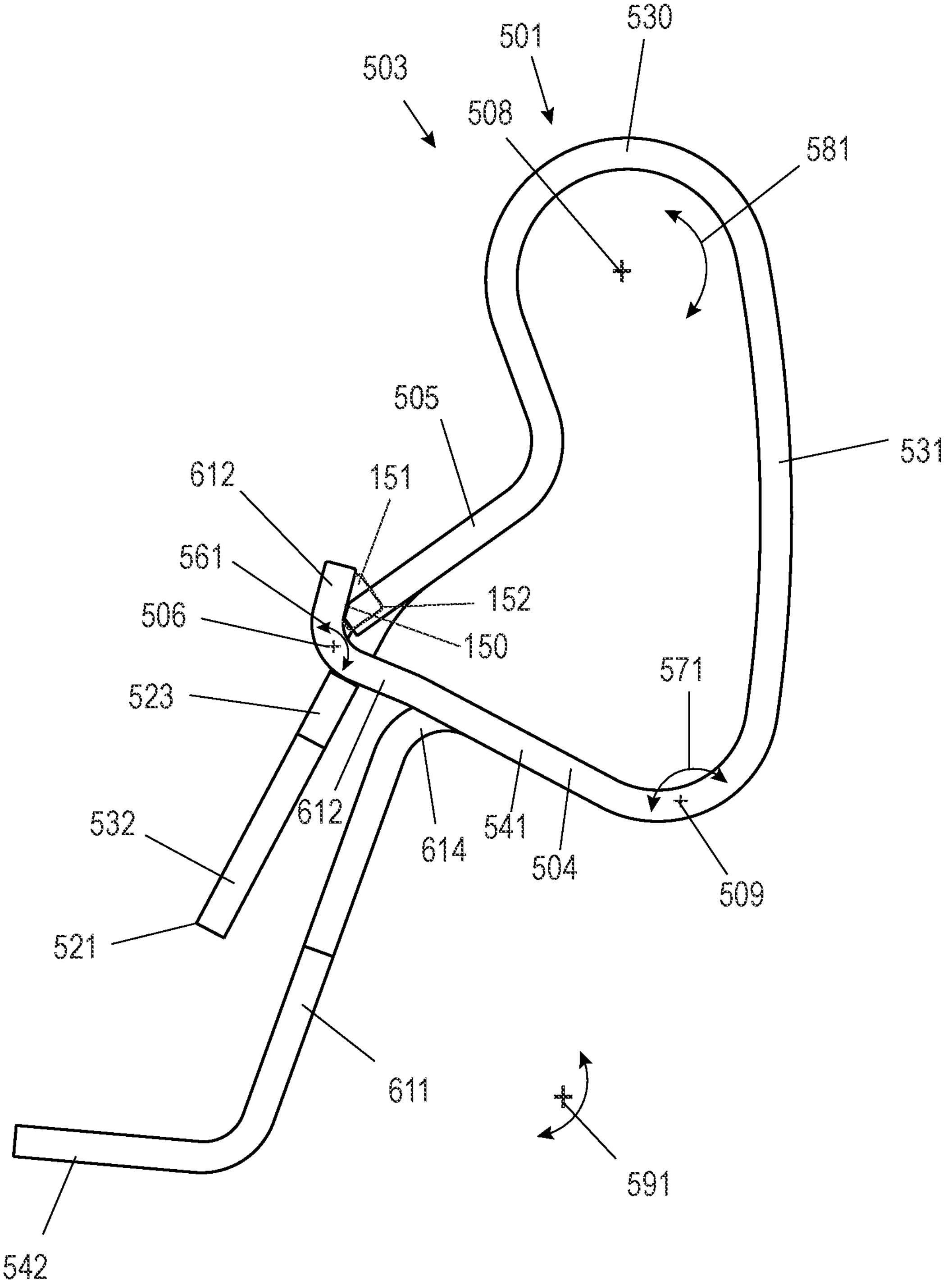
FIG. 2 is a front view of a clamping spring prior to mounting for use in an alternative spring-force clamp an alternate embodiment of the invention of FIG. 1.

When shifted further in the shifting direction 7, the conductor 6 pushes onto the pressure surface 42. As a result, the pivoting leg 41 is pivoted into the second pivoting direction 91. The clamping leg 32 is unlocked from the retaining device 412 and pivoted in the pivoting direction 81 into a clamping state, as is depicted in FIG. 2. The pressure surface 42, in the shifting direction 7, is arranged underneath the retaining device 412, such that in a simple manner free pivoting of the clamping leg 32 in and counter to the pivoting direction 81 is possible.

The spring-force clamp 1 can also have a resetting device 5. The resetting device 5 is shiftable in and counter to the shifting direction 7. It is provided for pivoting the clamping leg 32 of the clamping spring 3 counter to the pivoting direction 81. In this case, the clamping leg 32 can be pivoted back from the clamping state into the locking state by shifting the resetting device 5 counter to the pivoting direction 7, such that the locking device 322 of the clamping leg 32 of the clamping spring 3 locks onto the retaining device 412 of the pivoting leg 41 of the retaining spring 4. An electrical conductor 6 formerly clamped in the spring-force clamp 1 in the clamping state can then be retrieved from the spring-force clamp 1 again in the locking state.

In the embodiment shown in the drawing, the resetting device 5, in the locking state (see FIG. 1) and in the clamping state (see FIG. 2), is arranged above the locking device 322 integrally molded on the clamping leg 32. Therefore, when the clamping leg 32 is in the clamping state, the resetting device 5 acts directly onto the clamping leg 32 upon shifting in the shifting direction 7, such that the required shifting path for the pivoting-back of the clamping leg 32 is small. The resetting device is additionally formed substantially between the clamping spring and the conductor.

To actuate the resetting device 5, it can have an actuating groove which simplifies actuation with a tool such as a screwdriver In addition, the resetting device 5 can be clamped in this clamping state between the clamping leg 32 and the clamping housing 12, so that it is not released from the clamping housing 12.

FIG. 1 shows the clamping spring 3 and the retaining spring 4 in the locking state of the clamping leg 32 of the clamping spring 3. It should be recognized that the clamping leg 32, via its locking device 322 which is formed approximately on half of the longitudinal extent of the clamping leg 32, is locked on the retaining device 412 of the pivoting leg 41 of the retaining spring 4. The free space 13 between the busbar 2 and the clamping leg 32 can be clearly seen in FIG. 1.

FIG. 1 makes the active principle of a clamping mechanism clear, which can also be applied to the embodiment from FIG. 2 which is described below.

FIG. 2 shows an embodiment of another assembly 501 according to the invention made up of a clamping spring 503 and a retaining spring 504, which are formed as integral electrically conductive component 501. As in the embodiment of FIG. 1, the clamping spring 503 and the retaining spring 504, also alternatively to FIG. 2, can also be separate from one another and be retained in a housing, for example, and be functionally connected.

The clamping spring 503 of the component 501 or of the assembly according to the invention has a bend 530 similar to the embodiment from FIG. 1, which merges into a support leg 531. The clamping spring 503 is pivotable in a pivoting direction 581 about a pivot axis 508 opposite the support leg 531 and can be locked to the retaining spring 504 via resetting device 505. The support leg 531 then merges into a pivoting leg 541. The support leg 531 is arranged to be pivotable in the pivoting direction 571 about the pivot axis 509 opposite the pivoting leg 541. The pivoting leg 541 then merges into a retaining device 612 and, in a region of a bend 614, into another leg 611.

This leg 611 has a pressure surface 542 which is angled at the end to stop a conductor end in a manner similar to FIG. 1. The leg 611 is pivotable in the pivoting direction about another pivot axis 591.

The retaining device 612 arranged on the leg 541 is designed in the shape of a hook, wherein the hook is arranged pivotably about a pivot axis 506 in the pivoting direction 561, preferably by a few degrees. This allows locking with a terminal stop face 150 of the resetting device 505 of the clamping spring 503 with the retaining device 612 of the retaining spring 504.

In the extension of the region with the resetting device 505, the clamping spring 503 has a clamping leg 532 which runs beyond the locking region. In order to bypass the retaining device 612 which is preferably arranged on either side of the clamping spring 503, this has a tapered shape 523 and an abutment leg 521 attached thereto. The function of the previously described subregions of the assembly 501 according to the invention emerges directly when viewing the spring-force clamp 1 from FIG. 1.

Both the combination depicted in FIG. 1 and the combination depicted in FIG. 2 which are made up of the clamping spring 3, 503 and the retaining spring 4, 504 have, in the region of locking, corresponding stop faces 150 which have been modified within the framework of the present invention.

The locking mechanism is based substantially on supporting the respective clamping spring 3, 503 on retaining device 612 of the respective retaining spring. The clamping spring can be tensioned by the resetting device 5. The conductor 6 cancels the clamping mechanism by pressing on the pressure surface 42, 542, with the cancelling force depending on the locking geometry, the level of force of the construction, and the surface finish of the lock.

To modify and set the clamping forces to different areas of application, it is possible to modify the spring constant of the clamping spring, of the retaining spring and/or of the assembly as a whole. As is known, metals are to a certain extent elastically deformable, before they experience deformation in the event of high force application. The latter effect corresponds to the ductility characteristic of a metal.

The elasticity of the metal depends on several factors, including the finish of the metal lattice and, linked thereto, on the spacing of the metal atoms in the lattice, on the size of the metal atoms and on other deposits in the metal lattice. A single-stage or multistage targeted heating of the metal while retaining its basic form stability can lead to a certain extent to a new orientation of the metal lattice and, linked thereto, to a change in the elasticity of the metal and thus also of the metal component. This leads in particular to a new orientation of the metal due to lattice errors and the like. This same also applies to alloys. This heating step can lead to superficial oxidation tendencies and the formation of so-called temper colors on the surface of the metal component. Moreover, undesired proportions of residual austenite as deposits in the metal structure break down in a diffusion-controlled manner at more than 300° C. into ferrite and cementite. In summary, the metal structure of a component changes during heating.

Through a corresponding heat treatment of an off-tool spring, the normal force of the respective spring component and thus the spring constant can be advantageously increased due to the changes in the metal structure. At the same time, this change and, where applicable, surface oxidation lead to a change in the surface finish of the metal. The coefficient of friction is increased which is an undesired change. The coefficient of friction μ is a decisive factor in the triggering of the mechanism for clamping the conductor and locking the clamping spring to the retaining spring. It has been observed in several trials that triggering of the mechanism with the same application of force after annealing became less secure due to a higher distribution of the coefficient of friction.

This disadvantage of an altered surface finish, which is caused by the annealing, is reduced by surface treatment, in particular through the application of a lubricant layer onto the contact surfaces 152 between the clamping spring 3, 503 and the retaining spring 4, 504.

The lubricant can preferably be a lubricant which contains PFPE.

The lubricant, to set the viscosity, can additionally have a solvent, preferably a base oil. The proportion of the solvent is advantageously less than 20 wt %.

The proportion of PFPE, in particular hexafluoropropene, in the lubricant is preferably more than 75 wt %, preferably more than 85 wt %.

The applied lubricant preferably has a density between 1.55-1.75 g/cm$^3$ (at 20° C.) so that the application is particularly simplified. The boiling point is preferably between 50-60° C. Therefore, a subsequent application of the lubricant after the annealing of the metal components is to be recommended.

The application of the lubricant onto the component is performed only in sections, in particular in the contact region between the contact spring and the retaining spring. The coated application surface is preferably less than 300% of the contact surface, preferably less than 150% of the contact surface.

Contact surface 152 in the sense of the present application refers to the contact region in the locked state and the contact region in which the two springs slide over one another during the unlocking movement.

Thus, with regard to FIG. 2, the contact surface 152 should be understood to be the stop face 150 and the adjacent surface 151 up to the edge of the retaining device 612.

Figure 3:
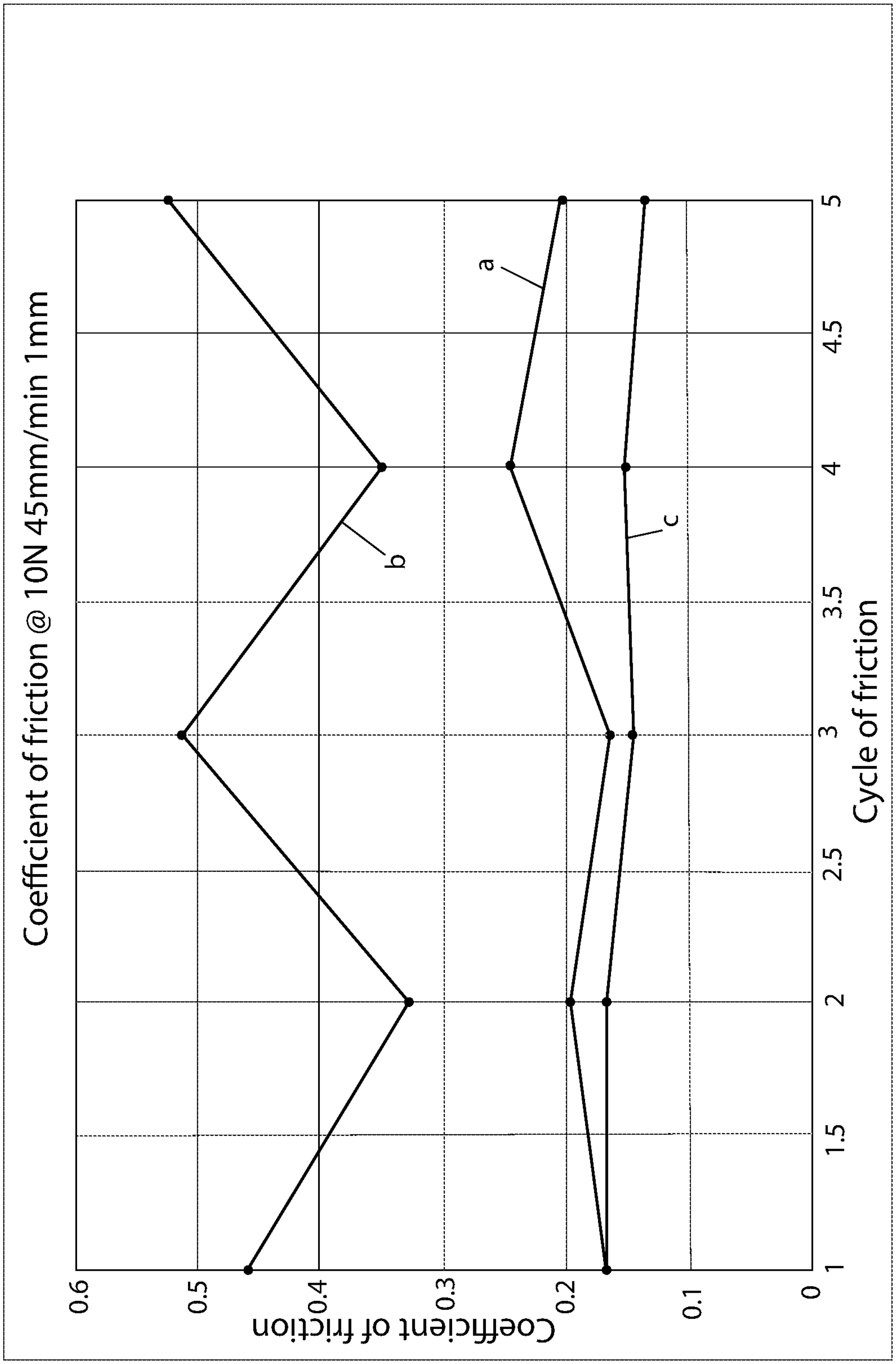
FIG. 3 is a schematic diagram showing examination results on the improvement of the coefficient of friction after annealing.

FIG. 3 shows the results of coefficients of friction calculated during laboratory tests. These were determined through an optical method within the framework of a microscopy or laser-scanning method.

The curve labelled a shows coefficient of friction measurements for an off-tool component with the configuration from FIG. 2. On the surface of the component, there is conventional punching oil.

The curve labelled b shows the coefficient of friction measurement of a component with punching oil, which has been annealed at 300° C. for 1 h.

The curve labelled c shows the coefficient of friction measurement of a component with punching oil, which has been annealed at 300° C. for 1 h, which has additionally been coated with a PFPE-containing lubricant according to the preceding description.

Both the above-discussed coefficient of friction increase through the annealing and the coefficient of friction decrease through the application of lubricant can be recognized from the tests.

The preferred layer thickness of the lubricant coating is at least 3 μm, particularly preferably 5-100 μm.

As an alternative to the limited application, in sections, of the coating material onto the assembly according to the invention, the coating can be performed by vapor-phase coating of the assembly according to the invention or of individual springs of the assembly with the coating material, such that a full-surface coating is formed at least on a spring or across the entire assembly.

What is claimed is:

1. An assembly for contacting an electrical conductor, comprising (a) a clamping spring for connecting an electrical conductor in a spring-force clamp; and (b) a retaining spring for locking the clamping spring in an open position such that a conductor can be introduced into a contact region in a shifting direction, wherein said clamping spring touches said retaining spring along a contact surface in a locked state and during the movement from the locking state into an unlocking state; and (c) a lubricant-containing coating arranged on at least said contact surface, wherein said retaining spring comprises an uncoated surface adjacent to said contact surface, said uncoated surface having a higher coefficient of friction than said contact surface.

2. The assembly as defined in claim 1, wherein said contact surface comprises a stop surface between said retaining spring and said clamping spring and an adjacent region of said retaining spring over which said contact spring slides during unlocking movement.

3. The assembly as defined in claim 1, wherein said lubricant-containing coating has a perfluoropolyether.

4. The assembly as defined in claim 3, wherein said perfluoropolyether comprises more than 75 wt % of the lubricant-containing coating.

5. The assembly as defined in claim 3, wherein a solvent comprises less than 20 wt % of said lubricant-containing coating.

6. The assembly as defined in claim 1, wherein said lubricant-containing coating has a density between 1.55-1.75 g/cm$^3$ at 20° C.

7. The assembly as defined in claim 1, wherein the assembly is formed as an integral component.

8. The assembly as defined in claim 1, wherein the assembly is colored by annealing coloring.

* * * * *